UNITED STATES PATENT OFFICE.

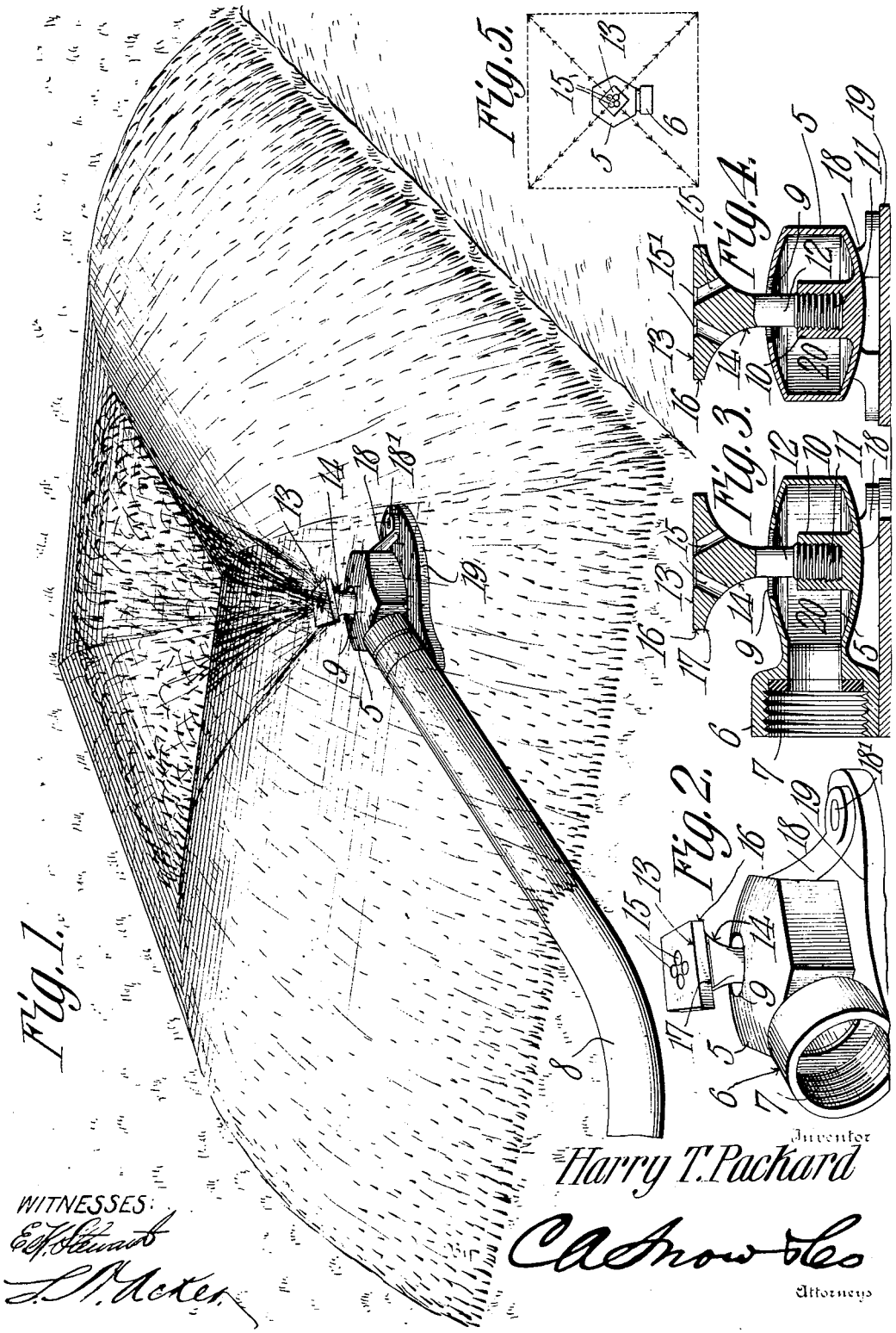

HARRY T. PACKARD, OF PASADENA, CALIFORNIA.

LAWN-SPRINKLER.

No. 879,892.　　　　Specification of Letters Patent.　　　　Patented Feb. 25, 1908.

Application filed August 23, 1907. Serial No. 389,901.

*To all whom it may concern:*

Be it known that I, HARRY T. PACKARD, a citizen of the United States, residing at Pasadena, in the county of Los Angeles and State of California, have invented a new and useful Lawn-Sprinkler, of which the following is a specification.

This invention relates to lawn sprinklers and has for its object to provide a sprinkler in which the water is discharged from the spraying nozzle in the form of a rectangular spray thereby to permit the entire surface of the lawn or other confined area to be uniformly and thoroughly irrigated.

A further object of the invention is to provide a sprinkler having a spraying stem seated within and disposed concentric with the discharge orifice, said stem being provided with a square head for deflecting the water laterally in the form of a rectangular spray.

A further object is to form the head of the spraying stem with converging water passages which receive a portion of the water from the discharge orifice and delivers the same in a finely divided state at the center of the rectangular spray.

A still further object of the invention is generally to improve this class of devices so as to increase their utility, durability and efficiency as well as to reduce the cost of manufacture.

Further objects and advantages will appear in the following description, it being understood that various changes in form, proportions and minor details of construction may be resorted to within the scope of the appended claims.

In the accompanying drawings forming a part of this specification: Figure 1 is a perspective view of a lawn sprinkler constructed in accordance with my invention. Fig. 2 is a similar view showing the sprinkler detached from the water conducting hose. Fig. 3 is a longitudinal sectional view of the same. Fig. 4 is a transverse sectional view. Fig. 5 is a top plan view, the course of the water being indicated by the dotted lines and arrows.

The improved sprinkler forming the subject matter of the present invention includes a casing or housing 5 having one end thereof provided with a cylindrical portion or nipple 6 the interior walls of which are threaded at 7 for detachable connection with a hose or similar water conductor 8.

The top of the casing 5 is provided with a centrally disposed discharge orifice 9 while the lower wall of the casing is provided with an integral vertically disposed boss or projection 10 having a socket formed therein the interior walls of which are threaded for engagement with the correspondingly threaded walls 11 of a spraying stem 12.

The stem 12 is disposed concentric with the walls of the discharge orifice 9 and is provided with a square head 13 for discharging the water from the orifice 9 in the form of a rectangular spray, as best shown in Fig. 1 of the drawing. The side walls of the head 13 at the juncture of the stem 12 are curved inwardly and downwardly, as indicated at 14 so that the water discharged from the orifice 9 will come in contact with the walls 14 and be deflected laterally on all four sides of the head.

The head 13 is provided with a plurality of converging water passages 15 preferably four in number, as shown, which extend from the curved walls 14 of the head and open through the upper flat surface thereof, the walls of the passages 15 at the upper surface of the head being inclined laterally at 15′ so that the water will be delivered in a finely divided state at the center of the rectangular spray and thus thoroughly sprinkle or irrigate the lawn or other surface.

The head 13 is provided with a marginal shoulder 16 the lower edge 17 of which by contact with the water serves to impart the rectangular shape to the spray and deflect the same laterally over the surface of the lawn.

Secured to or formed integral with the casing 5 are depending feet 18 the free ends of which are bent laterally and provided with terminal perforations for the reception of screws or similar fastening devices 18 which secure the sprinkler in position on a block or other suitable support 19 so as to prevent the sprinkler from injuring the grass when the device is in use.

It will thus be seen that when water is admitted to the casing 5 the latter will flow around the circular interior chamber 20 and thence pass upwardly and outwardly through the orifice 9 in contact with the curved walls 14 of the head and thence laterally against the lower edge of the marginal shoulder 16 thus delivering the water in the form of a rectangular spray on the surface of the lawn. As the water is discharged through the orifice 9 a portion of the same will pass upwardly through the passages 15 and thus thoroughly sprinkle or irrigate the lawn at the center of the rectangular spray, as best shown in Fig. 1 of the drawings.

The sprinklers may be made in different sizes and shapes and may be plated, japanned or otherwise coated to prevent the metal from corroding.

From the foregoing description it will be seen that there is provided an extremely simple, inexpensive and efficient device admirably adapted for the attainment of the ends in view.

Having thus described the invention what is claimed is:

1. A sprinkler including a casing having an intake and provided with an interior chamber having a discharge orifice, a stem disposed concentric with the walls of the orifice and provided with a rectangular head; the walls of said head at its juncture with the stem being curved inwardly and downwardly and provided with converging water passages opening through the top of the head.

2. A sprinkler including a casing having an intake and provided with a chamber having a discharge orifice, a projection extending vertically from one wall of the casing and having a threaded socket formed therein, a shank having its lower end threaded for engagement with the walls of the socket and its upper end disposed concentric with the walls of the orifice, said shank being provided with a rectangular head having converging water passages formed therein and opening through the top of said head.

3. A sprinkler including a casing having an intake and provided with a chamber having a discharge orifice communicating therewith, a stem disposed concentric with the orifice and provided with a rectangular head having converging water passages formed therein and opening through the top of the head, the walls of the passages at the upper surface of the head being inclined laterally.

4. A sprinkler including a casing having one end thereof provided with an enlargement, the interior walls of which are threaded for detachable engagement with a water conductor, said casing being provided with an interior chamber having a discharge orifice communicating therewith, a projection extending vertically from one wall of the casing and provided with a threaded socket, a stem having its lower end threaded for engagement with the walls of the socket and having its upper end extended through the orifice and provided with a substantially rectangular head; the side walls of the head at its juncture with the stem being curved inwardly and downwardly and provided with converging water passages opening through the top of the head.

5. A sprinkler including a casing having an intake and provided with a chamber having a discharge orifice, a stem disposed concentric with the orifice and provided with a substantially rectangular head, the side walls of which are curved downwardly and inwardly and provided with converging water passages extending from the curved walls to the top of the head, said head being provided with a marginal shoulder for deflecting the water laterally in the form of a rectangular spray.

In testimony that I claim the foregoing as my own, I have hereto affixed my signature in the presence of two witnesses.

HARRY T. PACKARD.

Witnesses:
WILLIAM J. CARR,
EDWARD F. HAHN.